United States Patent [19]

Leighton et al.

[11] Patent Number: 5,012,507
[45] Date of Patent: Apr. 30, 1991

[54] TELEPHONE ACTIVATED EMERGENCY LIGHT SYSTEM

[75] Inventors: Suzanne E. Leighton, 20160 Palomar, Lake Elsinore, Calif. 92330; Raymond J. Kemp, P.O. Box 1216, Wildomar, Calif. 92395; Philip D. Hawkins, Norco, Calif.

[73] Assignees: Raymond J. Kemp, Wildomar; Suzanne E. Leighton, Lake Elsinore, both of Calif.

[21] Appl. No.: 318,840

[22] Filed: Mar. 6, 1989

[51] Int. Cl.⁵ .......................................... H04M 11/04
[52] U.S. Cl. ..................................... 379/37; 379/386; 379/396
[58] Field of Search ..................... 379/36, 37, 38, 40, 379/45, 49, 51, 104, 105, 188, 199, 200, 354, 388, 396; 340/331, 332

[56] References Cited

U.S. PATENT DOCUMENTS

| 2,278,504 | 4/1942 | Wingardner. | |
|---|---|---|---|
| 3,798,375 | 3/1974 | Delisle | 379/40 |
| 3,860,762 | 1/1975 | Klaiber et al. | 379/200 X |
| 4,003,040 | 1/1977 | Browand | 340/332 |
| 4,425,480 | 1/1984 | Lischin | 379/200 |
| 4,521,645 | 6/1985 | Carroll | 379/42 |
| 4,547,761 | 10/1985 | Jones | 340/331 |
| 4,596,900 | 6/1986 | Jackson | 379/105 |
| 4,791,658 | 12/1988 | Simon et al. | 379/104 X |
| 4,878,236 | 10/1989 | Ray et al. | 379/37 |

OTHER PUBLICATIONS

Hasten Systems, Greenboro, NC, "The Hasten 500-911" Owner's Manual, ©1987.

Primary Examiner—Jin F. Ng
Assistant Examiner—Stelia L. Woo
Attorney, Agent, or Firm—Beehler & Pavitt

[57] ABSTRACT

A system for speeding response time to a telephone request for emergency assistance. The system passively monitors all dialing from the particular premises and responds to dialing of predesignated emergency numbers by activating an indicator such as a strobe light or a flashing lamp visible at some distance from the premises to positively identify the location of the emergency and attract relief personnel arriving into the area.

13 Claims, 3 Drawing Sheets

TELEPHONE ACTIVATED EMERGENCY LIGHT SYSTEM

BACKGROUND OF THE INVENTION

1. Field of the Invention

The present invention pertains generally to the field of emergency warning and alarm systems and is more particularly directed to an indicator system suitable for domestic use which is actuated upon dialing of a telephone number sequence associated with an emergency assistance service and when actuated activates a strobe or other indicator exterior to the premises for attracting and guiding personnel responding to the call.

2. State of the Prior Art

Emergency assistance services in urban areas are called upon in emergency situations where very short time spans can make the difference between success and failure in saving a life. Paramedic teams increasingly possess the capability of rescuing victims of accident or illness who may have undergone cardiac arrest, massive blood loss or otherwise be in a condition where life expectancy may be measured in seconds. If average response times in such situations can be reduced by as little as a few seconds an improvement in the rescue success rate is certain to result. Similar operating parameters exist for fire fighting teams or police personnel. Widely available smoke detecting equipment is capable of sensing a fire at its earliest stages when it can be easily extinguished. However, a very small fire can quickly spread into a major conflagration and again response time is critical. Likewise, even a few seconds gained in reaching the scene may avoid serious injury when police responds to a call for assistance.

In recognition of the need for ever increasing speed, centralized emergency telephone services have been implemented in many metropolitan areas, such as the well known 911 emergency assistance service. These services are supported by the local telephone companies so that dispatch personnel receiving a call at the 9!1 number is immediately provided with the street address at which the telephone call originates. The 911 dispatch center therefore only requires a general indication of the nature of the emergency from the caller in order to dispatch the proper type of help, without having to obtain accurate directions from an individual who may be unable to provide them.

Once the response team, whether an ambulance, fire engine or police vehicle, nears the address at which the request for assistance originated, the responding personnel is usually forced to proceed at a very deliberate pace in order to locate the exact street address. Particularly at night, the task of finding a particular house along a dark street is often inordinately difficult. In many areas, it is up to the homeowner to place address numerals on the residence. This is often done in a haphazard manner with numerals of all sizes, styles and colors mounted in unpredictable locations which may be poorly lit or obsured by garden vegetation etc. Emergency personnel responding to a call are thus often forced to proceed at a crawl along the street searching for a particular number, with the aid of a searchlight when at night. It is awkward for emergency vehicles such as ambulances or fire engines to back-up and therefore, rather than risk passing by the desired house number, the drivers proceed with excessive caution while attempting to locate the desired address.

What is therefore needed is a system capable of activating a readily visible indicator, preferably a visual indicator such as a strobe light, mounted exteriorly to the housing or other premises and which is activated upon making a telephone request for emergency assistance. Furthermore, it is desirable that such a system operate automatically without the deliberate intervention of any persons at the emergency site so as to insure its actuation merely upon the dialing of a telephone number sequence associated with an emergency assistance service.

Some existing alarm systems do feature a combination of automatic telephone dialing and activation of an exteriorly perceptible indicator, such as either a horn alarm or a flashing light or both, upon triggering of the alarm system. In such arrangements, the exterior lamp or horn does operate to attract attention to the affected premises, but only in response to actuation of the alarm system and independently of the automatic telephone dialing which places the call for assistance. Such existing arrangements are inadequate for the purposes described above.

SUMMARY OF THE INVENTION

The present invention seeks to satisfy the aforementioned needs by providing a system for facilitating the location of origin of telephone calls to one or more pre-designated emergency numbers. The novel system comprises a first circuit for passively monitoring the dialing of all telephone calls made from a particular location or premise. The monitoring circuiting includes a discriminator circuit for detecting the origination of a distress call while ignoring all other calls, and upon such detection, enabling a switch or relay connected for activating an indicator such as a strobe light or a flashing lamp mounted exteriorly to the premises, preferably at a location which is readily visible at some distance along the access road or street leading to the premises so as to positively identify the location of the emergency to relief personnel upon reaching the area.

In its preferred embodiment, the system of this invention is actuated immediately upon the dialing of a telephone number known to be assigned to an emergency service such as 911, the local police, paramedic or fire department telephone numbers, among still other possible services which may be featured in the novel system. The exterior indicator once actuated remains operative, notwithstanding that the telephone call for assistance is terminated, until it is disabled by separate means provided for that purpose such as a manually operated reset switch. The telephone monitor circuit may be housed in a small housing provided with standard modular telephone jacks or connectors for easy addition to any existing telephone system or may advantageously be incorporated into a telephone set in a common housing and may also powered by the telephone line voltage for better reliability.

The circuit of this invention can be made available at low cost for easy installation by the purchaser to operate in a passive and reliable manner thereby to expedite the delivery of emergency assistance services to the benefit of both the public and the municipal services responsible for providing such assistance. These and other advantages of the present invention will be better understood by reference to the accompanying detailed description of the preferred embodiments considered together with the attached drawings.

DETAILED DESCRIPTION OF THE PREFERRED EMBODIMENT

Figure 1:
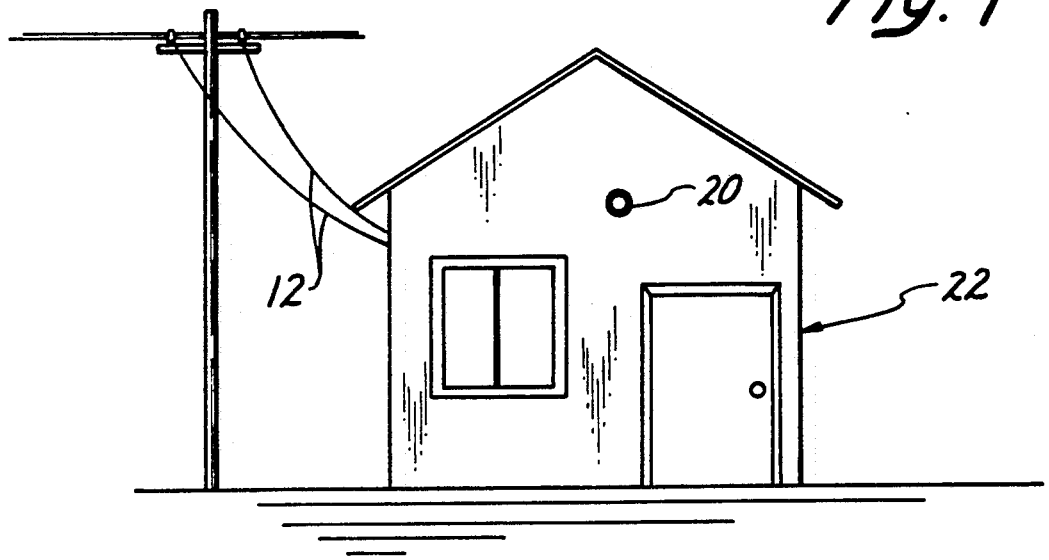
FIG. 1 is a front view of a typical dwelling equipped with an emergency warning light according to this invention.
Figure 2:
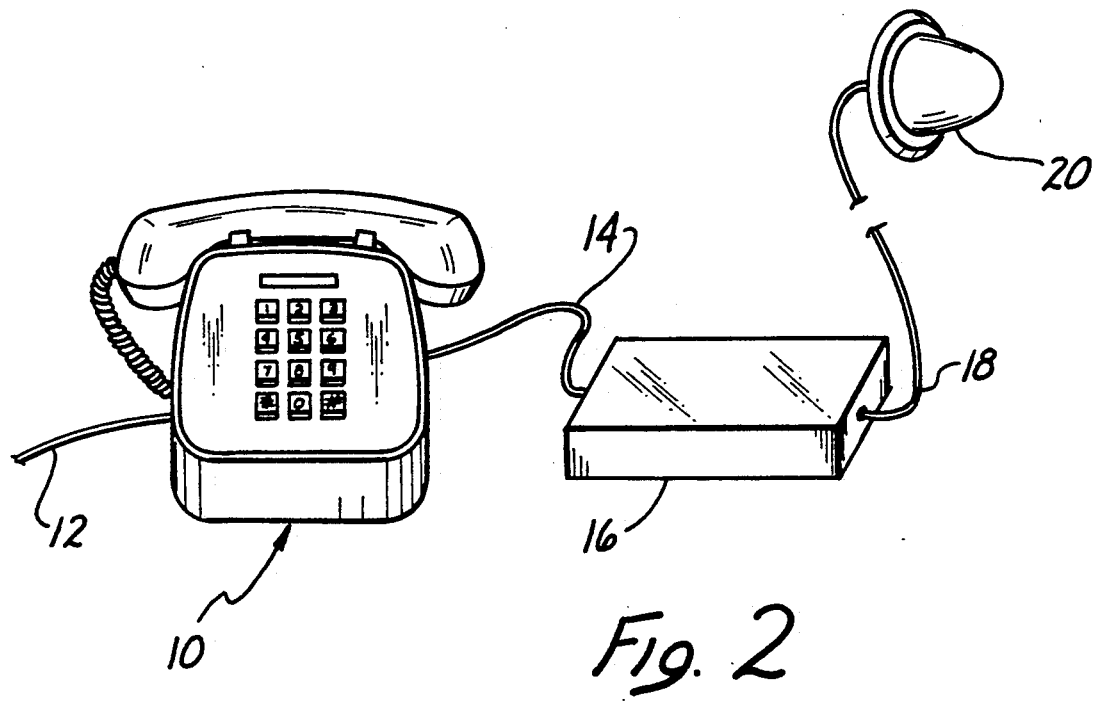
FIG. 2 shows, in perspective the interconnection of the main components of the novel system.

With reference to the drawings, wherein like parts are identified by like numbers, FIG. 1 shows the front of a typical house 22 with telephone wires 12 connected to the local telephone network. FIG. 2 shows a conventional Touch Tone tone dialing system telephone set 10 installed in the house 22 of FIG. 1 and connected to the telephone lines 12 through a phone jack, plug, or the like. Also connected to the telephone set 10 in parallel with the telephone conductors 12 is a second pair of conductors 14 which connect the input of the emergency telephone monitoring system 16 to the telephone lines 12. The monitor system 16 also has an output connected by conductors 18 to a visual indicator such as a high intensity strobe light 20 mounted exteriorly to the house 22 as indicated in FIG. 1, in a position plainly visible from the access street.

The purpose of the monitoring circuit 16 is to turn on the emergency light 20 if, and only if, a predesignated sequence of digits, i.e. a telephone number such as the emergency number 911, is dialed from telephone set 10 on the lines 12 to which the monitoring circuit 16 is connected.

By way of preliminary explanation and definitions, a telephone set is "on hook" when the handset of a conventional telephone is resting in its cradle. That is because the handset operates the hookswitch to the OFF position. When the receiver is picked up, the telephone is OFF hook, and a spring returns the hookswitch to the ON position. Consequently, when the telephone is ON hook the telephone is OFF, and when it is OFF hook the telephone is ON.

Electrical power for operation of the telephone is supplied by the Central Office of the local telephone company where a power source supplies a nominal voltage of 58VDC to the telephone lines 12. This voltage is present at the telephone terminals of lines 12, one of which is called "tip" and the other "ring", when the telephone is ON hook. This voltage may be of either polarity, i.e., the tip may be either positive or negative with respect to the ring.

When the handset is picked up, the telephone goes ON (OFF hook), the voltage on the telephone line drops abruptly from 48VDC to about 5VDC, and a current of about 25 milliamperes flows from the telephone lines 12 through the telephone set 10. The voltage drop of 43V between the Central Office power source and the telephone is due to the 25milliamperes of current flowing through the resistance of the wires and any trimming resistance at the Central Office.

The operation of the telephone monitoring circuit 16 shown in FIG. 3 will now be explained. While the telephone set 10 connected to input jack J1 is ON hook, capacitor C1 is charged to the line voltage of 48VDC. When the receiver is picked up, the line voltage drops and capacitor C1 discharges to 5VDC through R1, the primary winding of transformer T1, and the telephone lines 14, 12. This induces a voltage pulse of about 5V in the secondary winding of transformer T1.

This pulse is used to initialize, or reset, the circuit logic system, resetting the counter IC (Integrated Ciruit) A4 which will count the numerical sequence of the digits as they are dialed and decoded by the circuit. Also latches L1-L4 in IC's A7 and A8 (each has 4 latches) are reset. Since it is not known what DC polarity is being supplied by the Central Office at input jack J1 the polarity of the pulse at the secondary of T1 cannot be predicted, i.e. whether it will be a positive pulse or a negative pulse, and either polarity must be detected.

Inverter A1f senses a positive pulse, inverts it and passes it through Diode D7 to inverter A10a which inverts it again, producing a positive pulse at the output of A10a from where it is distributed to the reset inputs of ICs A4, A7 and A8. Inverter A1e senses a negative pulse, inverting it to a positive pulse which is again inverted by inverter A1d to a negative pulse at the output of A1d, from where it is passed through Diode D12 to inverter A10a. There it is inverted and passed to ICs A4, A7 and A8 as above. Diodes D7 and D12 perform the function of an "OR" gate such that a negative pulse from either A1f or A1d will drive the input of A10a negative.

A2 is a DTMF (Touch Tone tone dialing system) decoder and receives the two telephone dialing audio tones on pin 2. It decodes the number corresponding to the particular two-tone combination and outputs this number, in hexadecimal code, on pins 11, 12, 13 and 14. This hexadecimal code is connected to decoder IC A3 which in turn decodes this input to drive one of 16 discrete output lines according to the hexadecimal input.

The number "9" (pin 17 of A3) discrete output line is connected to pin 1 of AND gate A5a. About 40 milliseconds after the hexadecimal output IC A2 also produces an STD pulse on pin 15, indicating that a valid tone pair has been detected. This STD pulse drives the input of counter A4, which counts the number of valid digits dialed in a particular sequence of digits. i.e. the particular telephone number being dialed at set 10. A4, which has previously been reset to zero, will advance to the count of "1" which appears on pin 1 of A4. Pin 1 of A4 is connected to pin 2 of AND gate A5a. At the same time that the STD pulse clocks A4, it also starts a delay circuit comprised of A1a, A1b, & A1c. The output of A1c is a pulse delayed relative to the start of the STD pulse. The output of A1c is connected to pin 8 of AND gate A5a. Now gate A5a performs a logic operation as follows:

if the audio tones decoded by IC A2 correspond to the number "9" AND it is the first number dialed since counter A4 was last reset AND if it is a valid number as confirmed by the STD pulse output of A2, then the output of A5a goes high and sets (pin 4) latch L1 in A7 (A7 is a Quad latch IC). The output of latch L1 (pin 2 of A7) goes high. Pin 2 of A7 is connected to pin I of AND gate A9a.

When a second digit is dialed it is decoded by A2 and A3, and if it is a "1", pin 9 of A3 will go high and drive pin 3 of AND gate A5b. If it is also a valid number STD (pin 15 of A2) will go high and counter A4 will advance to a count of 2 on the corresponding discrete output and pin 3 of A4 will go high and drive pin 4 of AND gate A5b. Then the delayed STD pulse appears on pin 5 of AND gate A5b.

A5b now performs a logic operation similar to A5a: If the decoded tones correspond to the number "1", AND if it is the second number dialed AND if it is a valid number, then the output (pin 6) of A5b will go high and sets (pin 7) latch L2 of A7 connected to pin 2 of A9a.

In a similar fashion, if the third digit is a "1", the counter A4 advances to a count of 3 and discrete output pin 7 goes high, driving pin 12 of A5c high. Pin 11 of A5c will be high and if it is also a valid digit, pin 13 will be high. With all 3 inputs high, the output of A5c (pin 10) will go high. Pin 10 of a5c drives pin 12 of A7, setting latch L3 of A7 and the output of latch L3 (pin 10) goes high. This drives pin 8 of gate A9a high.

Gate A9a now performs the following logic operation: If the first digit was a "9" AND the second digit was a "1" AND the third digit was a "1", then the output of gate A9a (pin 9) goes high. This high signal goes to pin 15 of A7 and resets latch L4 of A7. The output of latch L4 (pin 1) goes low, turning transistor Q1 off, which releases relay K1 and closing the circuit connected to output lines 18, turning on the exterior lamp 20. Relay K1 has normally closed contacts when the relay is off. The relay K1 is initially energized by manual actuation of the reset switch S1, which sets latch L4 of IC A7, turning on Q1 which drives K1, thus holding open the relay contacts.

Gates A6a, A6b, and A6c and latches L1, L2 and L3 of IC A8 and gate A9b will detect the dial number sequence "999" and respond by turning on test indicator LED1. This allows testing of the circuit for proper operation without dialing "911".

Latch L4 of A8 is used to disable counter A4 after 4 digits have been dialed and decoded by IC A2. In normal operation, counter A4 will cycle back to zero after the eighth digit is dialed and continue repeating the cycle from zero to eight as long as digits are dialed. In a long dialing sequence to be detected and cause a false activation of the warning indicator lamp 20.

To avoid this result, the fourth discrete output of counter A4 (pin 11) will set latch L4 of A8. The output of latch L4 (pin 1) will go high, pulling pin 13 of A4 high, thus disabling A4, and preventing it from counting further until the entire logic circuit has been reset by the initializing pulse derived at the output of inverter A10a, indicating that a new digit sequence, i.e. a new telephone number, is being dialed.

Without departing from the principles described above, a simple circuit modification at A2 would enable a European model to be actuated by the telephone number 999 as the activating (emergency) digit sequence, in which case the testing number sequence could be 911.

It is also possible to power the circuit 16 using the power supplied by the telephone company Central Office (48V dropping to 5V), but since this may involve FCC or telephone company regulations, it may be preferable to provide for battery or A.C. operation. It is specifically contemplated that the emergency monitoring circuit 16 of this invention can be integrated into a telephone set, in which case it may be particularly desirable to take advantage of the telephone line 48/5 voltage, possibly even to the extent of powering the strobe light 20.

As an optional feature, a manual panic switch may be provided for actuating the lamp 20 independently of the monitoring system 16. This system can also actuate a siren thus serving as an intruder warning device, or by re-setting IC A2 it can activate through suitable relays, any electrical device, such as computer, coffee pot, etc. although this is not the primary purpose of the system.

Finally, the exterior emergency indicator light may be powered by solar energy, by solar recharged backup battery or by regular household current. Further, a radio frequency transmitter/receiver link or a low power laser/photodetector arrangement can eliminate the need for physical wiring 18 between the circuit 16 and lamp 20 or other indicator or devices activated by it.

Figure 3:
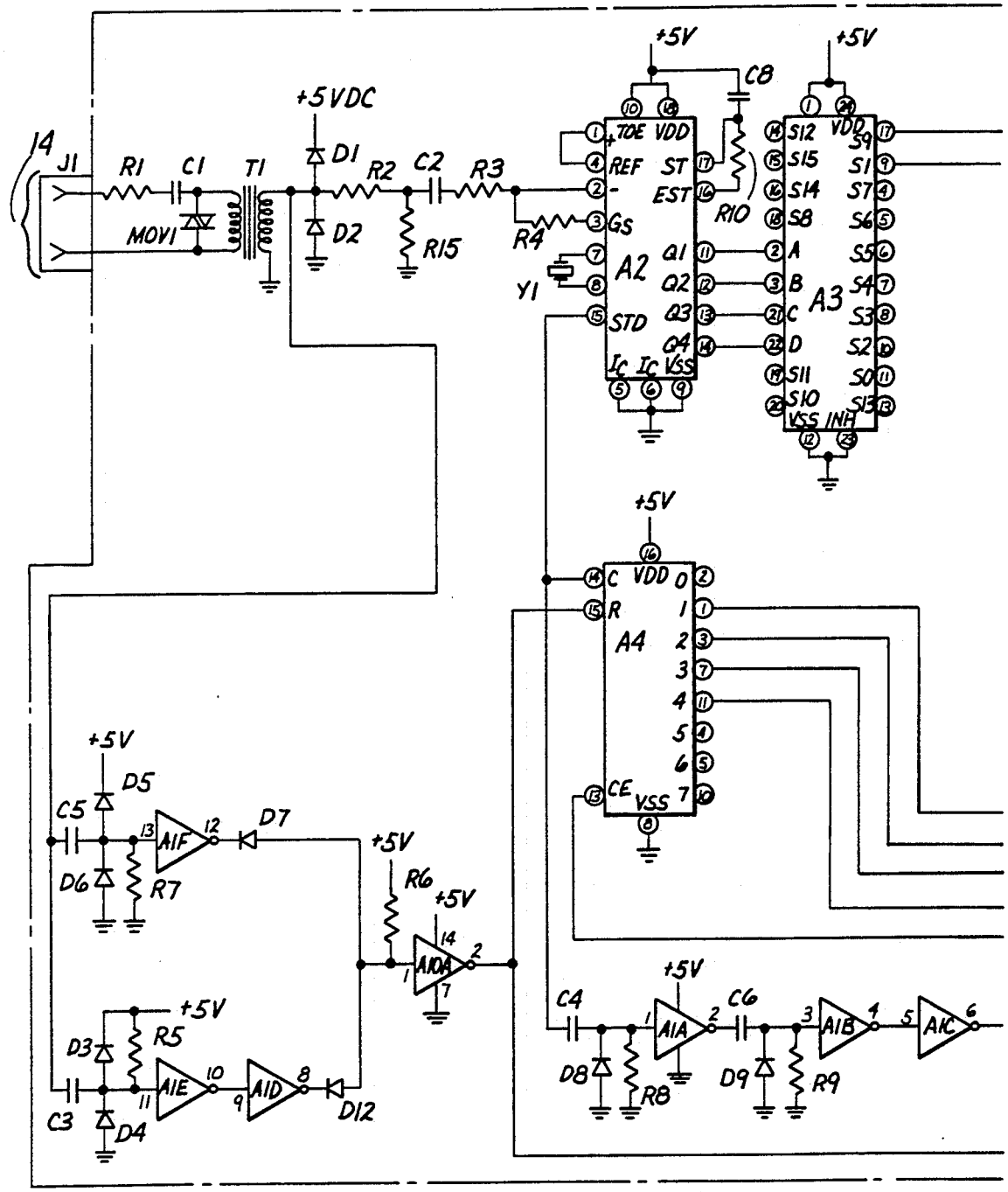
FIG. 3 is an electronic circuit diagram of the telephone monitoring circuit of this invention constructed as an add-on unit to an existing telephone set.
Figure 3:
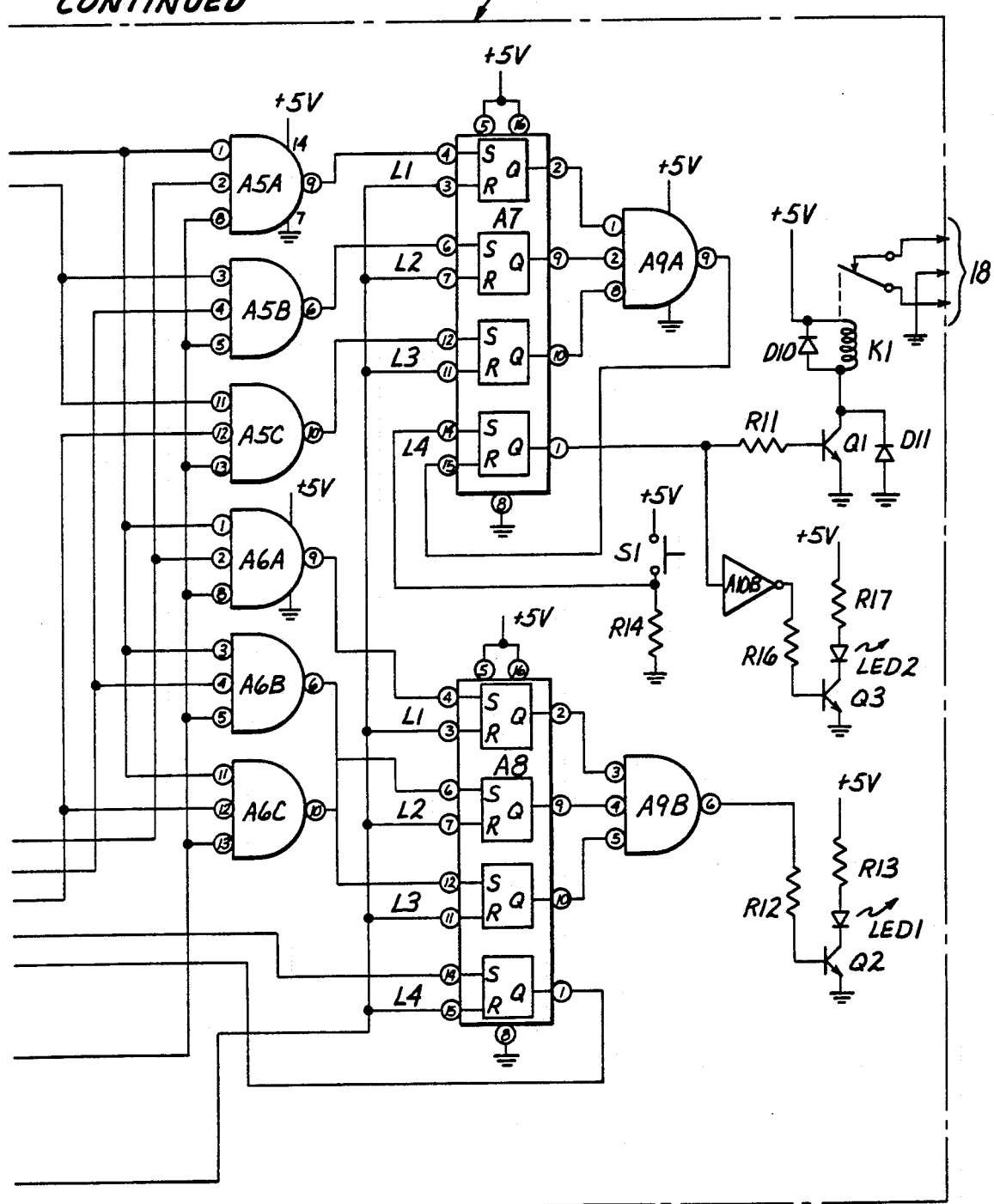

The following is a listing of component values for the presently preferred circuit shown in FIG. 3:

| REF. | QTY | DESCRIPTION |
|---|---|---|
| A1,A10 | 2 | IC SN74C14 HEX SCHMIDT INVERTER |
| A2 | 1 | IC G8870A DTMF DECODER |
| A3 | 1 | IC CD4514B 4 LINE TO 16 LINE DECODER |
| A4 | 1 | IC CD4022B COUNTER, OCTAL, DECODED |
| A5,A6,A9 | 3 | IC CD4073B TRIPLE 3-IN AND GATE |
| A7, A8 | 2 | IC CD4043B QUAD R-S LATCH |
| A11 | 1 | IC 78L05 VOLTAGE REGULATOR, 5V |
| R1 | 1 | RESISTOR, 10K, OHM, 1W, 5% |
| R2 | 1 | RESISTOR, 39K, OHM, 0.25W, 5% |
| R3 | 1 | RESISTOR, 100K OHM, 0.25W, 1% |
| R4,R10 | 2 | RESISTOR, 301K OHM, 0.25W, 1% |
| R5,R6,R7 | 3 | RESISTOR, 240K OHM, 0.25W, 5% |
| R8,R9,R14 | 3 | RESISTOR, 240K OHM, 0.25W, 5% |
| R11,R12,R16 | 3 | RESISTOR, 100K OHM, 0.25W, 5% |
| R13,R17 | 2 | RESISTOR, 1.0K OHM, 0.25W, 5% |
| C1 | 1 | CAPACITOR, 0.1 MFD, 600V, METAL FILM |
| C2,C3,C4 | 3 | CAPACITOR, 0.1 MFD, 50V, CERAMIC |
| C5,C6,C8 | 3 | CAPACITOR, 0.1 MFD, 50V, CERAMIC 10% |
| C9 | 1 | CAPACITOR, 10.0 MFD, 22V, ELECTROLYTIC, +80,−20% |
| C10,C11,C12 | 3 | CAPACITOR, 0.1 MFD, 50V, CERAMIC, 10% |
| Q1,Q2,Q3 | 3 | TRANSISTOR, MPSA13 |
| D1,D2,D3 | 3 | DIODE, 1N914 |
| D4,D5,D6 | 3 | DIODE, 1N914 |
| D7,D8,D9 | 3 | DIODE, 1N914 |
| D10,D11,D12 | 3 | DIODE, 1N914 |
| T1 | 1 | TRANSFORMER, 600 OHM TO 600 OHM PAN-MAG TTC-143 |
| MOV1 | 1 | VARISTOR, GE V150LA2 |
| K1 | 1 | RELAY, A1C SEIB05AXP SPST NORM CLOSED CONTACTS, 5V COIL - 1 AMP CONTACT |
| S1 | 1 | SWITCH, MOMENTARY, SPST. NORMALLY OPEN |
| LED1,LED2, | 2 | LIGHT EMITTING DIODE |
| Y1 | 1 | QUARTZ CRYSTAL, 3.579545 MHz. |

What is claimed is:

1. A system for facilitating the location of premises originating a distress telephone call by personnel responding to such call, comprising:

first means for continuously monitoring the dialing of telephone calls from the premises including discriminator means selectively responsive to the dialing of a particular sequence indicative of a distress call while ignoring all other dialing and switch means actuated upon such selective response, whereby indicator means may be enabled by said switch means for guiding personnel arriving into the general vicinity to the originating premises.

2. The system of claim 1 wherein said first means comprises Touch Tone tone dialing decoder means and said discriminator means comprises logic means for comparing each telephone number sequence dialed at said premises with one or more preselected sequence assigned to assistance services thereby to detect distress calls.

3. The system of claim 1 or claim 2 further comprising visual indicator means actuatable by said switch means.

4. The system of claim 3 wherein said visual indicator is a flashing lamp.

5. The system of claim 3 wherein said switch means once enabled for actuating said indicator means remains enabled until manually disabled.

6. The system of claim 1 further comprising modular connector means for connecting said first means to an existing telephone set.

7. Apparatus for attracting emergency assistance personnel responding to a telephone call placed from a telephone set serving the originating premises, comprising:
   decoder means for decoding all telephone number sequences dialed from said telephone set;
   logic means associated with said decoder means for detecting the dialing of a predetermined digit sequence;
   switch means actuated by said logic means responsive to said detection; and
   lamp means visible exteriorly to said premises for attracting personnel responding to a telephone call placed as a result of dialing of said predetermined digit sequence.

8. Apparatus for attracting emergency assistance personnel responding to a telephone call placed from a telephone set serving the originating premises, comprising:
   decoder means for decoding all telephone number sequences dialed from said telephone set;
   logic means associated with said decoder means for detecting the dialing of a predetermined digit sequence;
   switch means actuated by said logic means responsive to said detection;
   lamp means visible exteriorly to said premises for attracting personnel responding to a telephone call placed as a result of dialing of said predetermined digit sequence; and
   logic means for detecting a test digit sequence dialed from said telephone set and connected for enabling test indicator means for verifying proper operation of the apparatus.

9. Apparatus for attracting emergency assistance personnel responding to a telephone call placed from a telephone set serving the originating premises, comprising:
   decoder means for converting telephone dialing input signals to a digital output;
   counter means for accumulating an output count of digits converted by said decoder means in a particular dialing sequence;
   logic gate means receiving both said digital output and said output count for delivering a gate output responsive only to a particular sequence of digits represented by said telephone dialing input signals;
   switch means actuated by said gate output; whereby external indicator means can be activated by said switch means for attracting emergency assistance personnel to said premises.

10. The apparatus of claim 9 further comprising means for disabling said logic gate means upon exceeding a preset count of said output count.

11. Monitoring apparatus useful for detecting a telephone request for emergency assistance dialed from a telephone set comprising:
   Touch Tone tone dialing decoder means for converting dialing tones constituting a sequence of dialed digits generated by said set to a hexadecimal output, numeric decoder means for converting said hexadecimal output to first discrete outputs each representative of a particular digit, counter means having second discrete output totaling the number of digits converted in the sequence, a gate dedicated to each digit in a predesignated digit sequence, each said gate connected to selected ones of said first and second discrete outputs for setting a corresponding latch upon coincidence of the selected ouputs, said corresponding latches driving output gate means for actuating a switch responsive to setting of all said latches.

12. The apparatus of claim 11 further comprising means for sensing a voltage drop on telephone lines connected to said Touch Tone tone dialing decoder and for deriving a system reset pulse responsive to such drop thereby to reset said counter means.

13. The apparatus of claim 12 further comprising circuit means for disabling said counter for second discrete outputs in excess of a preset number to avoid false actuation of said switch.

* * * * *